United States Patent
Rashid-Farrokhi et al.

(10) Patent No.: US 6,377,812 B1
(45) Date of Patent: Apr. 23, 2002

(54) COMBINED POWER CONTROL AND SPACE-TIME DIVERSITY IN MOBILE CELLULAR COMMUNICATIONS

(75) Inventors: Farrokh Rashid-Farrokhi, English Town, NJ (US); K. J. Ray Liu, Silver Spring, MD (US); Leandros Tassiulas, Washington, DC (US)

(73) Assignee: University of Maryland, College Park, MD (US)

( * ) Notice: Subject to any disclaimer, the term of this patent is extended or adjusted under 35 U.S.C. 154(b) by 0 days.

(21) Appl. No.: 09/196,226

(22) Filed: Nov. 20, 1998

Related U.S. Application Data

(60) Provisional application No. 60/065,256, filed on Nov. 20, 1997.

(51) Int. Cl.$^7$ ................................................ H04Q 7/20
(52) U.S. Cl. ........................................ 455/522; 455/67.3
(58) Field of Search ............................... 455/450, 501, 455/506, 522, 63, 67.3, 68, 13.3, 69, 513, 277.2, 278.1, 523, 422, 133, 134, 135, 561, 275, 283, 3.3, 562; 370/335, 342, 431; 375/206, 341, 348, 347, 324, 232

(56) References Cited

U.S. PATENT DOCUMENTS

| | | | | |
|---|---|---|---|---|
| 5,313,495 A | * | 5/1994 | Kim | 375/341 |
| 5,347,535 A | * | 9/1994 | Karasawa et al. | 370/342 |
| 5,487,174 A | * | 1/1996 | Persson | 455/522 |
| 5,543,806 A | * | 8/1996 | Wilkinson | 342/368 |
| 5,615,226 A | * | 3/1997 | Lipa | 375/200 |
| 5,634,199 A | * | 5/1997 | Gerlach et al. | 455/63 |
| 5,844,951 A | * | 12/1998 | Proakis et al. | 375/347 |
| 5,960,330 A | * | 9/1999 | Azuma | 455/70 |
| 6,018,643 A | * | 1/2000 | Golemon et al. | 455/63 |
| 6,023,615 A | * | 2/2000 | Bruckert et al. | 455/277.2 |
| 6,037,898 A | * | 3/2000 | Parish et al. | 342/174 |
| 6,069,912 A | * | 5/2000 | Sawahashi et al. | 375/142 |
| 6,075,808 A | * | 6/2000 | Tsujimoto | 375/143 |
| 6,101,399 A | * | 8/2000 | Raleigh et al. | 455/561 |
| 6,144,861 A | * | 11/2000 | Sundelin et al. | 455/522 |
| 6,259,730 B1 | * | 7/2001 | Solondz | 375/232 |
| 6,275,543 B1 | * | 8/2001 | Petrus et al. | 375/324 |

* cited by examiner

*Primary Examiner*—Dwayne Bost
*Assistant Examiner*—Jean A Gelin
(74) *Attorney, Agent, or Firm*—Dykema Gossett PLLC

(57) ABSTRACT

In a mobile cellular communications system power control and space-time diversity are applied in combination to the uplink and downlink. In the uplink, mobile powers and equalization/diversity combining vectors at base stations are, calculated jointly, with the result that the mobile transmitted power is minimized, while the Signal to Noise Ratio (SNR) at each link is maintained above a threshold. In the downlink, a multitap transmit diversity strategy adjusts the transmit weight vectors with the result that the SNR at each mobile is set to a specified value. The combination of power control and space-time diversity apply to networks with fading channels, including networks in which the number of cochannels and multipaths are larger than the number of antenna elements. The invention achieves the optimal solution for the uplink that minimizes the mobile power, and achieves a feasible solution for the downlink if there exists any.

13 Claims, 6 Drawing Sheets

SYSTEM MODEL

CHANNEL MODEL

BLOCK DIAGRAM OF A RECEIVER SPACE-TIME COMBINER

BLOCK DIAGRAM OF THE COMBINER

BLOCK DIAGRAM OF A TRANSMIT DIVERSITY COMBINING

BLOCK DIAGRAM OF THE OVERSAMPLED RECEIVE DIVERSITY COMBINING

MOBILE LOCATIONS FOR 100 USERS

THE TOTAL MOBILE POWERS AT EACH ITERATION; 100 USERS AND $\gamma = .03$; (P: NUMBER OF ARRAY ELEMENTS. Q: THE LENGTH OF EQUALIZER).

THE TOTAL BASE STATION POWERS AT EACH ITERATION; 100 USERS AND $\gamma=.03$; (P: NUMBER OF ARRAY ELEMENTS, Q: THE LENGTH OF EQUALIZER).

THE TOTAL MOBILE POWERS AS A FUNCTION OF THE NUMBER OF USERS; $\gamma=.05$

THE TOTAL BASE STATION POWERS AS A FUNCTION OF THE NUMBER OF USERS; $\gamma = .05$

COMBINED POWER CONTROL AND SPACE-TIME DIVERSITY IN MOBILE CELLULAR COMMUNICATIONS

This appln claims benefit of Prov. No. 60/065,256 filed Nov. 20, 1997. +gi

GOVERNMENT RIGHTS

This invention was made with U.S. Government support under Contract No. MIP 9457397 awarded by the National Science Foundation. The U.S. Government has certain rights in the invention.

BACKGROUND OF THE INVENTION

This invention relates generally to radio communications networks and more particularly to optimizing performance with multipath fading channels. Specifically, a combination of transmit power control and joint space-time diversity is used to optimize the communications links in the entire network.

The capacity of a cellular mobile communications system comprising a network of base stations and mobile stations is limited by the cochannel interference (CCI) and Inter Symbol Interference (ISI). CCI is due to interference caused by users sharing the same channel, and IST is caused by delayed components of a signal when the delay spread in a multipath channel is larger than a fraction of a symbol. It is well known that channel capacity can be increased by using space-time diversity strategies at the base stations to reduce CCI and ICI.

In the uplink (mobile stations transmitting, base stations receiving), adaptive receiver beamforming (space diversity) schemes have been widely used to reduce both CCI and ISI, and to adjust the beam pattern to optimally increase the effective signal to noise ratio (SNR) at tie output of the beamformer. In order to reduce CCI, the beamformer will place nulls at the directions of interference, while the gain at the direction of the desired transmitter is maintained constant. In a single tap diversity, the signal from the main path is considered as the signal of interest, and the beamformer will reject the ISI terms by placing nulls at the directions of multipath signals. However, rejecting the ISI terns by beamforming is an inefficient way of using spatial diversity. A more effective way is to exploit the temporal properties of the multipath signal and reduce ISI by using the delayed versions of the signal in the estimation of the transmitted symbol, and using the beamforming capability of the array for the CCI rejection. Joint implementation of this space-time diversity will optimally reduce CCI and ISI with large delay spread in the wireless channels, resulting in a significant increase in the SNR. Receiver diversity can be implemented independently at each base station receiver, without affecting the performance of other links, using a local feedback from the receiver output to adjust the combining vectors.

In the downlink (base stations transmitting, mobile stations receiving), receive diversity is not practical because it is difficult to deploy antenna arrays at the mobile stations. However, the downlink capacity can be improved using transmit diversity with antenna arrays at the base station transmitters by adjusting the beam pattern of each antenna array to minimize the induced interference to undesired receivers. Transmit diversity is substantially different in nature from receive diversity. Transmit beamforming at a base station transmitter will change the interference to all mobile receivers, and as a result transmit beamfbnning must be done jointly in the entire network. Furthermore, the signal probing has to be done at the mobile stations, while antenna array beam patterns are adjusted at the base stations, except for Time Division Duplex (TDD) systems where uplink and downlink channels are reciprocal and the uplink channel information can be used for downlink. Transmit beamforming by placing nulls at the direction of each cochannel receiver is well adapted to cases where the number of cochannels are less than the number of antenna elements. Such strategies include selective transmission in reciprocal networks which uses the weight vectors calculated by a singe tap diversity combiner at the receiver, rejecting the ISI by placing the beamformer nulls at the directions of the interference sources; adjustment of the transmitter patterns to minimize the overall interference to the other cochannel receivers using single tap transmit diversity; and in multi-path networks with large delay spread and having the number of available nulls less than the number of antenna elements, the use of multitap transmit diversity to reject the interference to other links by placing nulls at the directions of the multipath signal to the undesired users.

The link quality is not guaranteed in any of the aforementioned receive or transmit diversity schemes. Furthermore by considering adaptive transmit beamforming between a transmitter and only its receiver, the possible erects that a change of beam pattern in that transmitter could have on all receivers in the entire network are ignored. Finally, use of these schemes does not guarantee a feasible solution for all cochannel links in a network such that the SNR is satisfied at each link.

According to the present invention, joint space-time diversity is combined with transmit power control in both the uplink and do ink in the uplink; the result will be to minimize mobile transmit power while maintaining the SNR in each link above a threshold value. In the down the result will set the SNR at each mobile station to a specified value if a feasible solution exists.

SUMMARY OF THE INVENTION

In the present invention joint space-time diversity and transmit power control are combined in networks with multipath channels.

In the uplink case, the mobile power allocation and multitap receive diversity combining weight vectors are calculated such that the mobile transmitted power is minimized, and the SNR at each link is maintained above a threshold. Compared to prior art multitap diversity methods, the link quality is satisfied at each link while the transmitted power is minimized for each transmitter.

In the downlink case, the effect of beamforming at a transmitter is considered within the context of the entire network, and a set of feasible space-time diversity weight vectors and power allocations are jointly found to achieve the required link quality at each link. The beampattern of all the antennas in the network are adjusted jointly such that the SNR at each link is grater than a predetermined threshold, which will favor links with higher interference level.

In a TDD system, where the transmit and receive channels are reciprocal, the uplink weight vectors are used to calculate the downlink power allocations such that the link quality is satisfied at each link. In a Frequency Division Duplex (FDD) system or a TDD system with fading, where the uplink and downlink channels are different, the downlink channel gains are required to calculate the downlink diversity vectors and power allocations. The downlink channel characteristics must be measured at the mobile stations and transmitted to the base station through a feedback channel. In the present invention feasible combining weight vectors are calculated using the global channel measurements, which will result in a feasible solution to the joint problem if there exists any, even in the case that the number of cochannels are larger than the number of array elements.

Instead of estimating the channel response and implementing a matched filter, the received signal can be oversampled at the array input to minimize the estimation error due to the sampling of a continuous time received signal. Oversampling can be applied to the transmit and receive diversity schemes.

DETAILED DESCRIPTION

Before describing the preferred embodiments, it is necessary to describe the system model for the communications network and the prior art method of receive diversity combining. Consider a set of cochannel links, which may he base stations as in code-division multiple-access (CDMA) systems, or may use distinct base stations as in time-division multiple-access (TDMA) networks. Each link consists of a mobile and its assigned base station. At each link there are maximum L paths, Coherent detection is possible so that it is sufficient to model this multiuser system by an equivalent base band model. Antenna arrays with P elements are used only at base stations. Under slow fading, the received signal at the ith base station, denoted by $x_i(t)$, is:

$$x_i(l) = \sum_{m=1}^{M} \sum_{l=1}^{L} \sqrt{\rho_{mi} G_{mi} \alpha_{mi}^l P_m} \, a_{mi}(\theta_l) u_{mi}(l - \tau_{mi}^l) + n_i(t)$$

where $\rho_{mi}$ models the loss-normal shadow fading, $\alpha_{mi}$ and $G_{mi}$ are the lth path fading and loss from the mth mobile to the ith base station, respectively. $P_m$ is the transmitted power by the mth mobile. T is the symbol duration. $a_{mi}(\theta_1) = [a^1_{mi}(\theta_1), \ldots, a^P_{mi}(\theta_1)]^T$ is the array response to the signal coming from the mth mobile at direction $\theta_1$. $n_i(t)$ is the thermal noise vector at the ith base station array. The signal $u_{mi}(t)$ can be expressed as a function of the message symbols $s_m(n)$ by $$u_{mi}(l) = \sum_{n=0}^{k} g_{mi}(l - nT) s_m(n)$$

where $k=[l/T]$, and $g_m(t)$ models the effect of waveform and channel response. Under slow fading the variation of the channel response during a symbol period is negligible. The signal at the output of the array can be written as $$x_i(t) = \sum_{m=1}^{M} \sum_{n=0}^{k} \sum_{l=1}^{L} \sqrt{\rho_{mi} G_{mi} \alpha_{mi}^l} \, a_{mi}(\theta_l) g_m(t - nT - \tau_{mi}^l) s_m(n) + n_i(t) \quad (1)$$

Figure 1:
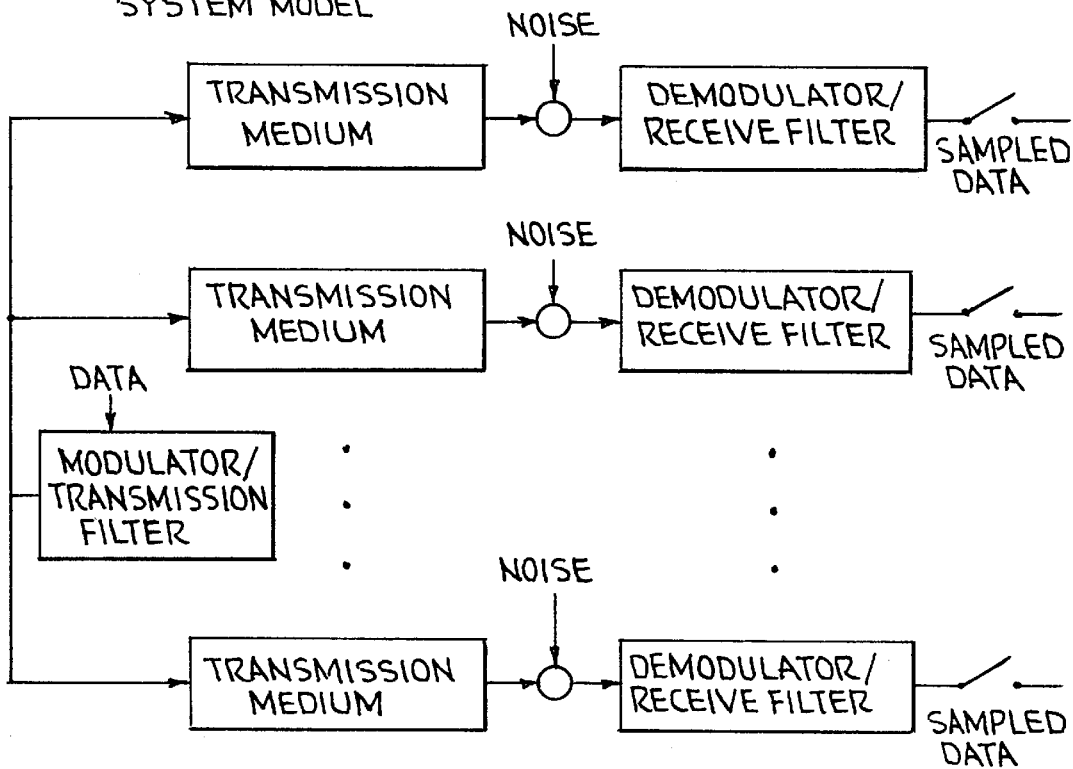
FIG. 1 is a block diagram of the system model.

The block diagram of a system with adaptive arrays at receivers is shown in FIG. 1. The receiver filter is a whitened match filter, so that its sampled data outputs form a set of sufficient statistics for the estimation of the transmitted symbols, $s_m(n)$, $0 \leq n \leq k$. Also the matched filter at the pth element of the array element at the ith base station is basically a filter matched to the impulse response of the channel from the ith mobile to the pth element of the array. Denote the impulse response of this filter by $f_{mi}^P(t)$. Therefore the received signal at the pth array element at the output of matched filter is given by:

$$l_i^P(k) = \int l_i^P(t) f_{mi}^P(t - kT) dt$$

$$= \sum_{m=1}^{M} \sum_{n=0}^{k} \sum_{l=1}^{L} \sqrt{\rho_{mi} G_{mi} \alpha_{mi}^l P_m} \, a_{mi}^P(\theta_l) \int g_{mi}(t - nT - \tau_{mi}) s_m(n) f_{mi}^P(t - kT) dt +$$

$$\int n_i(t) f_{mi}^P(t - kT) dt.$$

The sampled output at the symbol intervals is written as $$x_i^P(k) = \sum_{m=1}^{M} \sum_{n=0}^{k} \sum_{l=1}^{L} \sqrt{\rho_{mi} G_{mi} \alpha_{mi}^l P_m} \, a_{mi}^P(\theta_l) R_{mi}^{fg}(k - n) s_m(n) + n_i(k) \quad (2)$$

where $R_{mi}^{fg}(k-n)$ is defined as $$R_{mi}^{fg}(k - n) = \int g_{mi}(t - nT - \tau_{mi}) f_{mi}^P(t - kT) dt$$

$$= \int g_{mi}(t - \tau_{mi}) f_{mi}^P(t - (k - n)T) dt$$

Assuming that the effective support of the channel response is NT, we modify (2) as:

$$x_i^P(k) = \sum_{m=1}^{M}\sum_{n=0}^{k}\sum_{l=1}^{L}\sqrt{\rho_{mi}G_{mi}\alpha_{mi}^l P_m}\, a_{mi}^P(\theta_l)R_{mi}^{fg}(n)s_m(k-n)+n_i(k)$$

Now define the impulse response from the mth mobile to the pth element of the ith base station by $$h_{mi}^P(n) = \sum_{l=1}^{L}\sqrt{\rho_{mi}G_{mi}\alpha_{mi}^l}\, a_{mi}^P(\theta_l)R_{mi}^{fg}(n)$$

Figure 2:
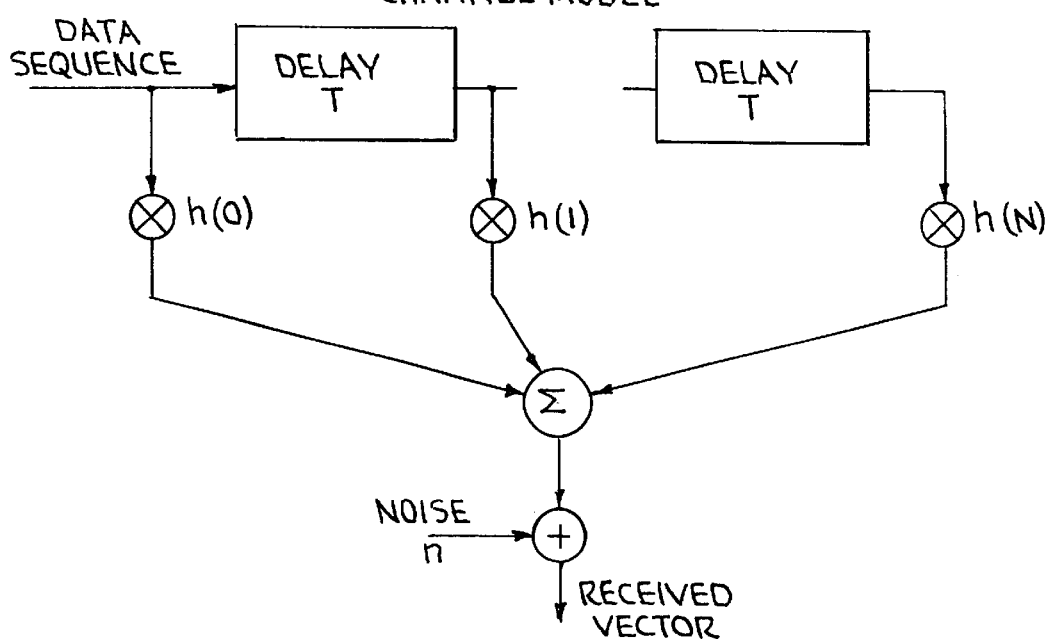
FIG. 2 is a block diagram of the channel model.

The channel model, including transmitter and receiver matched filters, is depicted in FIG. 2. The vector channel impulse response for the equivalent discrete model is given by $$h_{mi}(n)=[h_{mi}^1(n),\ldots,h_{mi}^P(n)]^T \quad (3)$$

Assume that the length of the impulse response is N. Then we can express the sampled received signal vector as $$x_i(k) = \sum_{m=1}^{M}\sum_{n=0}^{N-1} h_{mi}(n)\sqrt{P_m}\, s_m(k-m)+n_i(k) \quad (4)$$

However, we are more interested in the matrix presentation of the channel, and multiplication instead of convolution. Therefore we define the channel response matrix $H_{mi}$ as $$H_{mi}=[h_{mi}(0),\ldots,h_{mi}(N-1)] \quad (5)$$

and modify (1) as $$x_i(k) = \sum_{m=1}^{M} H_{mi}\sqrt{P_m}\, s_m(k)+n_i(k) \quad (6)$$

where $s_i(k)=[s_i(k),\ldots,s_i(k-N+1)]^T$.

Figure 3:
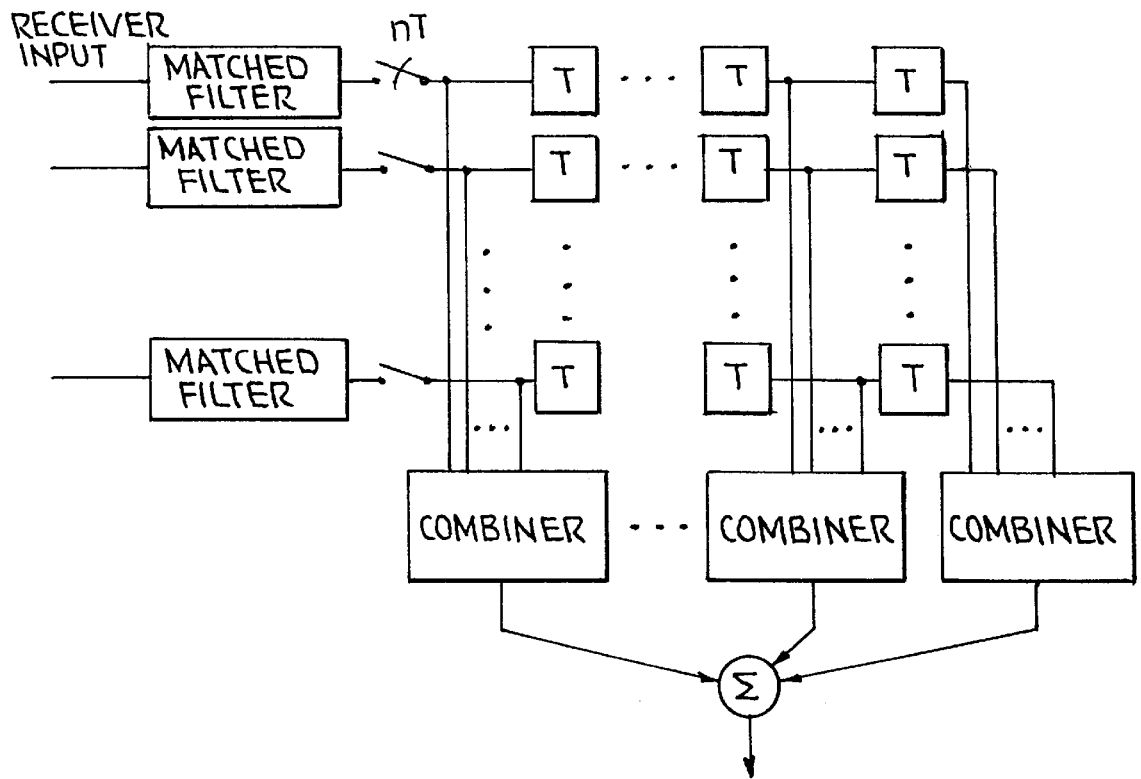
FIG. 3 is a block diagram of a receiver space-time combiner.
Figure 4:
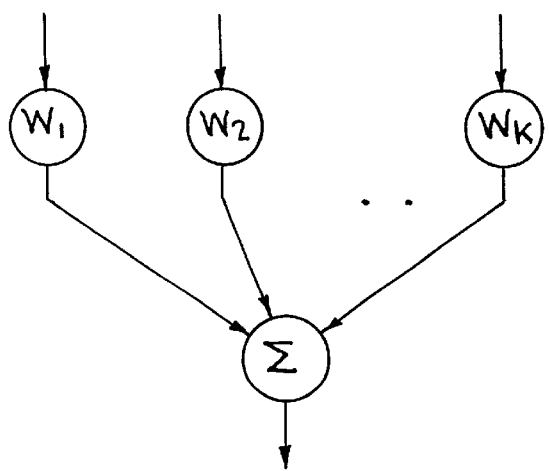
FIG. 4 is a block diagram of the combiner.

In a single tap diversity combiner the delayed version of the signal of interest is considered as interference which is to be rejected at the output of the combiner, but in a multitap combiner as shown in FIG. 3, the desired signal and its delayed versions can contribute to the estimation of the transmitted symbol. In a sense, the multitap diversity combiner is a broadband beamformer, and the simple combiner is a narrowband beamformer. It is clear that the narrowband one can not perform well in multipath environments where the delay spread of signals produces effective broadband signals. The T blocks in FIG. 3 produce one symbol interval delay. A combiner, shown in more detail in FIG. 4, simply calculates the weighted sum of its input signals. The maximum delay of the diversity combiner, denoted by Q is also called the length of equalizer. When Q=1, the system is called single tap diversity combiner, and when M=1 the system is an equalizer The output of the diversity combiner can be expressed as $$y_i(k) = \sum_{q=0}^{Q-1} w_i^H(q)x_i(k+q) \quad (7)$$

$$y_i(k) = \sum_{q=0}^{Q-1} w_i^H(q)\sum_{m=1}^{M} H_{mi}\sqrt{P_m}\, s_m(k+q)+n_i(k+q)$$

The beamformer-equalizer output power is $$E[y_i(k)y_i^*(k)] =$$

$$E\left[\left|\sum_{q=0}^{Q-1} w_i^H(q)\sum_{m=1}^{M} H_{mi}\sqrt{P_m}\, s_m(k+q)+n_i(k+q)\right|^2\right]$$

To simplify the derivations, we define $w_i=[w_i(0),\ldots,w_i(Q-1)]^T$, and $X_i=[x_i(0),\ldots,x_i(k+Q-1)]^T y_i(k)= W_i^H X_i(k)$ The aim is to adjust the weight vectors to achieve maximum signal to interference ratio at the output of combiner. For this purpose, we use a training sequence which is correlated with the desired signal, $s_i(n)$. The weight vectors are adjusted during the transmission of the training sequence and are kept constant in between training phases. The frequency of updating the weight vectors should be high enough such that the channel response can be considered constant between the training phases. In the combining process we try to minimize the difference of the output of combiner $y_i(k)$ and the training sequence $d_i(k)$:

$$E_{i,min}=\min_{w_i} E\{|d_i(k)-W_i^H X_i(k)|^2\} \quad (8)$$

The combining vector $W_i$ is given by $$W_{i,min}=\arg_{w_i}\min E\{|d_i(k)-W_i^H X_i(k)|^2\} \quad (9)$$

The optimum combiner coefficients are given by a Weiner solution:

$$W_{i,min}=\Phi_i^{-1}P_i$$

where $$\Phi_i E(X_i(k)X_i^H(k))$$

and $$P_i=E\{X_i d_i^*(k)\}$$

Many computationally efficient and recursive techniques are available to solve (9) such as Least Mean Square (LMS) or Recursive Least Square (RLS).

In a communications network with power control capability, transmitted powers are updated based on the SNR at each receiver. The SNR is a function of receive diversity combining vectors at each receiver. On the other hand, the diversity combining weight vectors are also dependent on the transmitted power. In an embodiment of the invention for the uplink, the base station receive diversity combining vectors and allocated mobile station powers in the network are jointly calculated.

First we evaluate the SINR at each combiner as a function of the gain matrix $H_{mi}$, weight vector $W_i$, and transmitted powers. For simplicity, the training sequence is considered as a delayed version of the signal of interest. That is, $d_i=s_i(k+D)$, where D is chosen to center the space time combiner, i.e., D=Q/2 and Q>N. The noise vector $n_i$ consists of spatially and temporally white noise components which are independent of the received signal. That is the correlation matrix can be simplified as $$\Phi_i = \sum_{m=1}^{M} P_m E\left\{\begin{bmatrix} H_{mi} s_m(k) \\ \vdots \\ H_{mi} s_m(k+Q-1) \end{bmatrix} [s_m^H(k) H_{mi}^H \ldots s_m^H(k+Q-1) H_{mi}^H]\right\} + \quad (11)$$

$$N_i I,$$

The cross correlation vector $p_i$ is given by $$p_i = E\left\{s_i(k+Q/2)\begin{bmatrix} \sum_{m=1}^{M} H_{mi}\sqrt{P_m}\, s_m(k) + n_i(k) \\ \vdots \\ \sum_{m=1}^{M} H_{mi}\sqrt{P_m}\, s_m(k+Q-1) + n_i(k) \end{bmatrix}\right\} =$$

$$\sqrt{P_i}\begin{bmatrix} 0 \\ h_{ii}(0) \\ \vdots \\ h_{ii}(N-1) \\ 0 \end{bmatrix} = \sqrt{P_i}\, g_{ii},$$

where $N_i$ is the thermal noise power at the input of each array element. We assume the signal transmitted from different sources are uncorrelated, and the signal transmitted from a source is also uncorrelated zero mean sequence of symbols. Then (11) can be simplified as:

$$\Phi_i = \sum_{m=1}^{M} P_m G_{mi} + N_i I \quad (12)$$

$G_{mi}$ is a block matrix whose pqth block is defined as $$[G_{mi}] = H_{mi} J_{p-q} H_{mi}^H,$$

where $J_{p-q}$ is a matrix which only has all ones on p–qth diagonal in parallel with main diagonal elements. The correlation matrix $G_{min}$ can be separated into signal and interferences matrices:

$$G_{ii} = G_{ii}^s + G_{ii}^I$$

where $G_{ii}^s = g_{ii} g_{ii}^H$. The power of the desired signal at the output of beamformer is given by $W_i G_i^H G_{ii}^s W_i$ and the interference power from the mth mobile is $W_i^H G_{mi}^I W_i$ where $$G_{mi}^I = \begin{cases} G_{mi} & m = i \\ G_{ii} - G_{ii}^s & \text{otherwise} \end{cases}$$

As a result, the SINR at the beamformer output can be written as $$\Gamma_i = \frac{W_i^H \Phi_i^s W_i}{W_i^H \Phi_i^I W_i} = \frac{P_i W_i^H G_{ii}^s W_i}{\sum_m P_m W_i^H G_{mi}^I W_i + N_i W_i^H W_i} \quad (13)$$

In order to provide the required link quality, the CIR at link i should be at least $\gamma_i$. Consider a beamforming vector set $A = \{w_i, \ldots, w_M\}$. A set of cochannel links is feasible if there exists a power vector $P = [P_1, \ldots, P_M]^T$, and a set A Such that the link quality is satisfied for each link. That is, $$\Gamma_i \geq \gamma_i$$

For a fixed diversity combiner, the minimal transmitted power is achieved when $\Gamma_i = \gamma_i$. The minimum power allocation can be achieved by iterative power control schemes which are proposed for systems with fixed gain antennas:

$$P_i^{n+1} = \gamma_i P_i^n \frac{w_i^H \Phi_i^I w_i}{w_i^H \Phi_i^s w_i} = \gamma_i \frac{\sum_m P_i w_i^H G_{mi}^I w_i + N_i w_i^H w_i}{P_i w_i^H G_{ii}^s w_i}$$

where $P_n^i$ is the transmitted power at the nth iteration by the ith mobile. Similar to systems with fixed gain antennas we can show that the above iteration starting from an arbitrary power vector $P^0$, converges to the optimum power allocation for the desired SNR.

Now the problem is defined as to minimize the total transmitted power while the link quality is maintained at each link:

$$\min_{A,P} \sum_i P_i$$

$$s.t. \Gamma_i \geq \gamma_i$$

If the set of cochannel links is feasible, there exists a set of optimal weight vectors and power allocations, such that the transmitted powers are minimal among all feasible solutions. In order to find the joint power control and combining vector, the algorithm steps at the nth iteration are given as follows:

Algorithm A:

The combiner vector is obtained by $$W_i^n = \arg\max_{w_i} \frac{W_i^H \Phi_i^s W_i}{W_i^H \Phi_i^I W_i} = \arg\max_{w_i} \frac{P_i^n W_i^H G_{ii}^s W_i}{\sum_m P_i^n W_i^H G_{mi}^I W_i + N_i W_i^H W_i}$$

Transmitted power is updated by $$P_i^{n+1} = \gamma_i P_i^n \frac{W_i^{n^H} \Phi_i^I W_i^n}{W_i^{n^H} \Phi_i^s W_i^n} = \gamma_i \frac{\sum_m P_i^n W_i^{n^H} G_{mi}^I W_i^n + N_i W_i^{n^H} W_i^n}{P_i^n W_i^{n^H} G_{ii}^s W_i^n}$$

The above algorithm converges to the optimal power allocations and combining vectors such that the transmitted power is minimized among all feasible power allocations and combining vectors.

In the following we will show that SNR can be estimated using $E_{min}$, the minimum mean squared error at the combining step. Without loss of generality we assume that the variance of reference signal is unity. From $E_{min}$ and the principle of orthogonality, we can then show that $$E_{i,\min} = \min_{m_i} E\{|d_i - w_i^{11} x_i|^2\} = 1 - w_i^H \Phi_i w_i = 1 - P_i g_{ii}^H \Phi_i^{-1} g_{ii}$$

The total power at the output of the beamformer is given by $$P^T = w_i^H \Phi_i w_i = P_i g_{ii}^H \Phi_i^{-1} g_{ii}$$

Desired signal power is then expressed as $$P_i^s = P_i w_i^H G_{ii}^s w_i = P_i (g_{ii}^H \Phi_i^{-1} g_{ii})^2$$

and the SINR at the output of beamformer can be written as $$\Gamma_i = \frac{P_i(g_{ii}^H \Phi_i^{-1} g_{ii})^2}{1 - P_i g_{ii}^H \Phi_i^{-1} g_{ii}} = \frac{1 - E_{i,min}}{E_{i,min}}$$

The power control iteration in the above algorithm is then modified as $$P_i^{n-H} = P_i^n \frac{\gamma_i}{\Gamma_i} = \gamma_i P_i^n \frac{E_{i,min}}{1 - E_{i,min}}$$

Therefore, in order to update the transmitted power, $E_{min}$ in is evaluated at each base station (measured locally) and sent to the assigned mobile. Knowing its previous transmitted power and the target SINR, the mobile will update its power.

Figure 5:
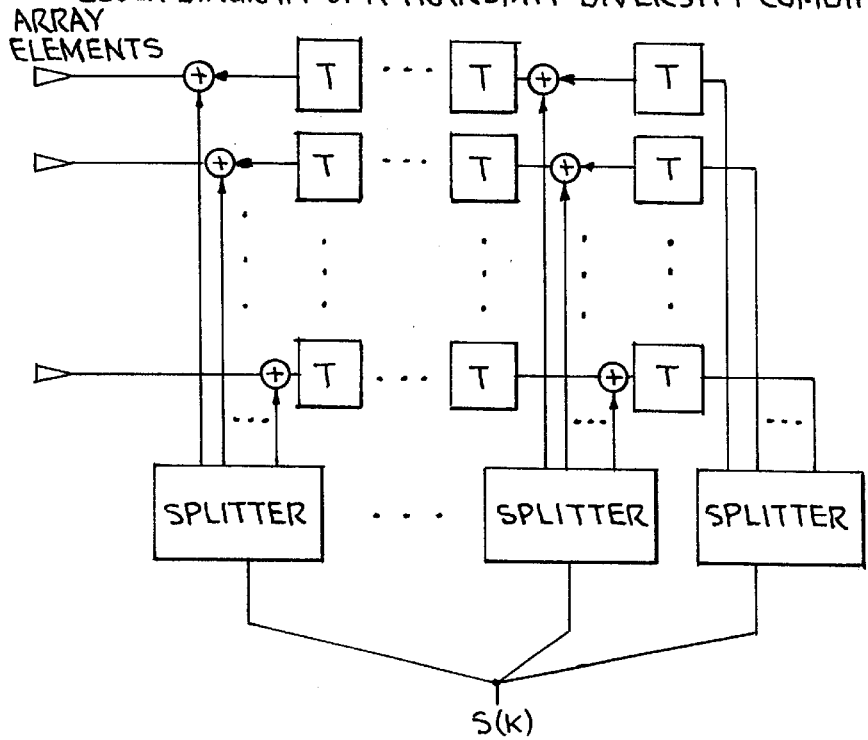
FIG. 5 is a block diagram of transmit diversity combining.

In a another embodiment of the invention for the downlink, transmit power control and array beamforming at the base stations are jointly calculated by a method which finds a set of weight vectors such that the desired SNR at each mobile is guaranteed. The block diagram of a multitap transmit diversity system is shown in FIG. 5, which is the dual of the graph in FIG. 3. Note that when Q=1 the system is called single tap transmit diversity system and when M=1 the system is a prequalizer. For each mobile there is a multitap diversity combiner at the base station. If a base station is assigned to more than one mobile, the output of each transmit diversity system would be combined at antenna elements.

The received signal at the ith mobile is a superposition of the signal due to the transmitted vector and its delayed versions through the multipath channel. The transmitted vector by itself is a weighted combination of the desired signal and its delayed versions.

For weight vectors which are time independent (steady state), denote the diversity vector at the qth tap of the bth base station by $\tilde{W}_b^H(q)$. The received signal is then given by $$\tilde{y}_i(t) =$$

$$\sum_{b=1}^{B} \sum_{n=0}^{k} \sum_{l=1}^{L} \sum_{q=0}^{Q-1} \tilde{w}_b^H(q) a_{ib}(\theta_l) \sqrt{\rho_{ib} G_{ib} \alpha_{ib}^l} \; g_{ib}(t - nT - \tau_{ib}^l) \sqrt{\tilde{P}_b} \; \tilde{s}_b(n-q) + \tilde{n}_i(t)$$

(14)

where k=[t/T], $s_b$ is the message signal transmitted from the bth base station to its associated mobile, and $\tilde{P}_b$ is its assigned power. $\tilde{n}_i(t)$ is the thermal noise at the ith mobile. In this case since there are multiple sources transmitting to the receiver, we can not implement the matched filter. However, we assume that a filter with the response $h_i(t)$ is used at the ith receiver whose output is sampled at T intervals:

$$\tilde{y}_i(k) = \sum_{b=1}^{B} \sum_{q=0}^{Q-1} \sum_{n=0}^{k} \sum_{l=1}^{L} \tilde{w}_b^H(q) a_{ib}(\theta_l) \sqrt{\rho_{ib} G_{ib} \alpha_{ib}^l} \; \sqrt{\tilde{P}_b} \; \tilde{s}_b(n-q) \times$$

$$\int g_{ib}(t - nT - \tau_{ib}^l) h_i(t - kT) dt + \int \tilde{n}_i(t) h_i(t - kT) dt,$$

or $$\tilde{y}_i(t) =$$

$$\sum_{b=1}^{B} \sum_{n=0}^{k} \sum_{l=1}^{L} \sum_{q=0}^{Q-1} \tilde{w}_b^H(q) a_{ib}(\theta_l) \sqrt{\rho_{ib} G_{ib} \alpha_{ib}^l} \; \sqrt{\tilde{P}_b} \; \tilde{s}_b(k - n + q)$$

$$R_{ib}^{gh}(n) + \tilde{n}_i(k)$$

That is, the channel can be modeled by a discrete impulse response given by:

$$h_{ib}(n) = \sum_{l=1}^{L} a_{ib}(\theta_l) \sqrt{\rho_{ib} G_{ib} \alpha_{ib}^l} \; R_{ib}^{gh}(n)$$

Assuming that the length of the discrete equivalent impulse response is N, we can rewrite the sampled version of (14) at the T interval as $$\tilde{y}_i(k) = \tag{15}$$

$$\sum_{b=1}^{M} \sum_{n=0}^{N-1} \sum_{q=0}^{Q-1} w_b^h(q) h_{ib}(n) \sqrt{\tilde{P}_b} \; \tilde{s}_b(k - n + q) + \tilde{n}_i(k)$$

It follows that $$\tilde{y}_i(k) = \sum_{b=1}^{B} \sum_{q=0}^{Q-1} \tilde{w}_b^H(q) h_{ib}(n) \sqrt{\tilde{P}_b} \; \tilde{s}_b(k - n + q) + \tilde{n}_i(k) \tag{16}$$

where $\tilde{W}_b = [\tilde{w}_b^T(0), \ldots, \tilde{w}_b^T(Q-1)]^T$, $\tilde{s}_b(k) = [\tilde{s}_b(k), \ldots, \tilde{s}_b(k-N+1)]^T$, and $\tilde{X}_{ib}(k) = [\tilde{x}_{ib}^T(k), \ldots, \tilde{x}_{ib}^T(k-Q+1)]^T$, where $\tilde{x}_{ib}(k) = H_{ib}\sqrt{+e, otl} \; \tilde{P}_b + ee \; \tilde{s}(k)$ Then the received signal at the ith receiver is expressed as $$\tilde{y}_i(k) = \sum_{b=1}^{M} \tilde{W}_b^H \tilde{x}_{ib}(k) + \tilde{n}_i(k) \tag{17}$$

Similar to the receive diversity (uplink), the desired signal power at the ith receiver is given by $\tilde{P}_i W_i^H G_{ii}^s W_i$ and the interference power from the bth base is given by $\tilde{P}_b W_b^H G_{ib}$ where $G^s_{ii}$ and $G^I_{ib}$ are defined as in the uplink. The SINR at this receiver is given by $$\Gamma_i = \frac{\tilde{P}_i W_i^H G_{ii}^s W_i}{\sum_b \tilde{P}_b W_b^H G_{ib}^I W_b + \tilde{N}_i}$$

where $\tilde{N}_i$ is the thermal noise power at the ith mobile, and $G^I_{ib}$ is defined as in the uplink. Unlike the uplink case there is no optimal power allocations and weight vectors that for a specific link quality minimize the transmitter power element-wise. As a result, in this embodiment we seek the power allocation and weight vectors such that the link quality is satisfied at each link That is, $\Gamma_i = \gamma_i$, $i=1, \ldots, M$ which in matrix form can be written as $\tilde{P} = D_w F_w^T \tilde{P} + \tilde{u}_w$ where $D_w$ and $F_w$ are defined as:

$$[F_w]_{ij} = W_i^H G_{ji} W_i \quad (18)$$

$$D_w = diag\left\{ \frac{\gamma_1}{W_1^H G_{11}^s W_1}, \ldots, \frac{\gamma_M}{W_M^H G_{MM}^s W_M} \right\} \quad (19)$$

and $$[\tilde{u}_w]_i = \frac{\gamma_i \tilde{N}_i}{W_i^H G_{ii}^s W_i}$$

In the following we consider the problem of the joint computation of a feasible set of combining weight vectors and power allocations. In order to achieve a feasible solution for downlink, we run the diversity combining for a virtual network whose channel responses are similar to downlink, and at each iteration we use the same combining vector for the downlink. The algorithm steps at the nth iteration are as follows Algorithm B:

1. Diversity combining and equalization for the virtual uplink:

$$w_i^n = \arg\max_{w_i} \frac{W_i^H \Phi_i^s W_i}{W_i^H \Phi_i^I W_i} = \arg\max_{w_i} \frac{P_i^n W_i^H G_{ii}^s W_i}{\sum_m P_i^n W_i^H G_{mi}^I W_i + N_i W_i^H W_i}$$

2. Virtual uplink power update ($P^{n+1}$):

$P^{n+1} = D_w[n] F_w^T[n] P^n + u_w[n]$

3. Downlink power update ($P^{n+1}$):

$\tilde{P}^{n+1} = D_w[n] F_w^T[n] \tilde{P}^n + \tilde{u}_w[n]$

In the above algorithm $w_i^n$ is the optimal beamforming for the power allocation at the nth iteration. $F_w[n]$ and $D_w[n]$ are defined as in (18) and (19) where $w_i$ is replaced by $w_n^i$, and $u_w[n]$ is defined as $$[\tilde{u}_w]_i = \frac{\gamma_i N_i |W_i^n|^2}{(W_i^n)^H G_{ii}^s W_i^n}$$

The transmitted downlink power at the ith transmitter is given by, $$\sum_{q=1}^{Q-1} \tilde{P}_i(w_i^n)^H (q) w_i^n(q) = \tilde{P}_i(W_i^n)^H W_i^n$$

In order to show that the above algorithm converges to a feasible solution for the downlink, we first use the fact that the uplink power vector converges to a constant (optimal) power allocation. Then we conclude that the uplink gain matrix converges to a fixed matrix whose eigenvalues are inside the unit circle. Using the fact that the eigenvalues of the gain matrix in the downlink are the same, we conclude that the downlink iteration is convergent if the uplink is so.

The first two steps of the nth iteration are similar to the uplink power update equations. In a feasible network, the first two iterations of algorithm B converge to a fixed power allocation. Therefore the beamforming vectors are also converging to fixed beamforming vectors, which are given by:

$$\hat{w}_i = \arg\max_{w_i} \frac{P_i W_i^H G_{ii}^s W_i}{\sum_m P_m W_i^H G_{mi}^I W_i + W_i^H W_i}$$

The following linear system $x[+1] = C[n]x[n] + d[n]$ is called asymptotically constant if $C[n] = C + E[n]$ and $$\lim_{n \to \infty} |E[n]| = 0$$

It is well known that the asymptotically constant system is asymptotically stable if the matrix A has al its eigenvalues inside the unit circle.

The convergence of Algorithm B can be shown by showing that all the eigenvalues of the system given by the third step of the algorithm, are inside the unit circle. Assuming that the virtual uplink is feasible, we know that the eigenvalues of the uplink gain matrices are inside the unit circle. The eigenvalues of uplink and downlink matrix are the same, as it is shown in the following.

The eigenvalues of $D_w[n] F_w[n]$ are the roots of $$|D_w F_w - \lambda I| = |D_w||F_w - \lambda D_w^{-1}| = |D_w||(F_w - \lambda D_w^{-1})^T| \quad (20)$$

$= |D_w||F_w^T - \lambda D_w^{-1}| = |D_w F_w^T - \lambda I| = 0$

As a result, the eigenvalues of the downlink gain matrix are also inside the unit circle.

The spectral radius of $D_w[n] F_w[n]$ and $D_w[n] F_w^T[n]$ are the same when $\rho(D_w[n] F_w[n]) \leq 1$ when $\rho(D_w[n] F_w^T[n]) \leq 1$ and vice versa. The feasibility of uplink and downlink are also equivalent. Since in downlink power control problem the downlink gain matrix is converging to $D_w[n] F_w^T[n]$ whose eigenvalues are all inside the unit circle, the downlink iteration are also convergent and the asymptotically constant system, given in Algorithm B, is stable.

Figure 6:
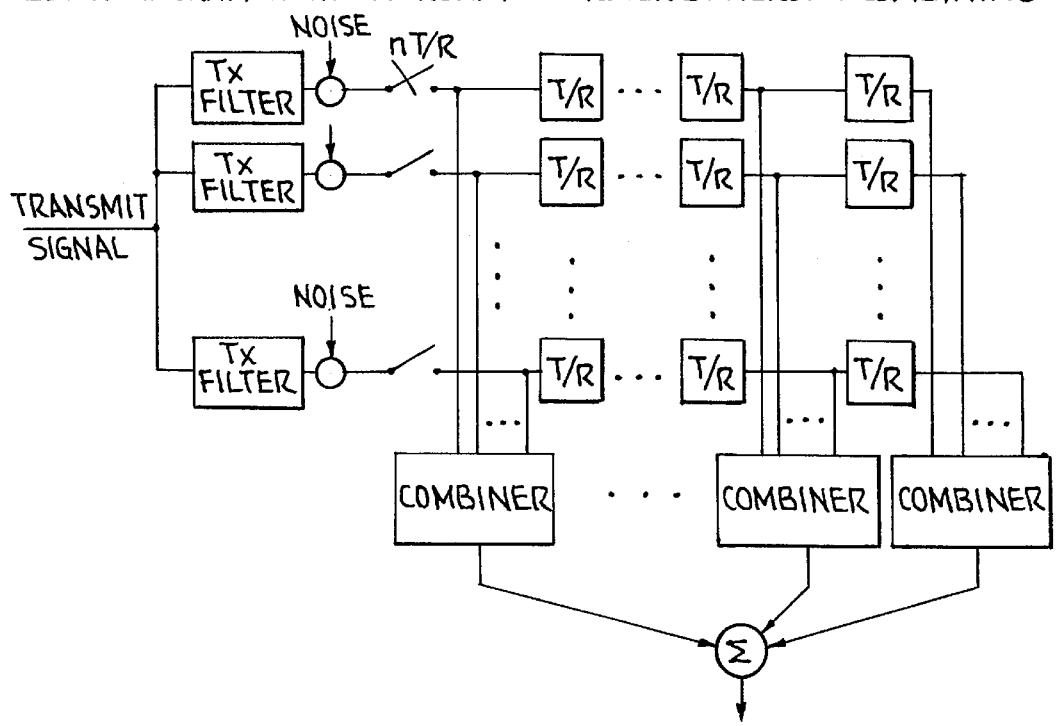
FIG. 6 is a block diagram of oversampled receive diversity combining.

In a another embodiment of the invention for the receive diversity (uplink) case, if the channel response is not available, the matched filter cannot be used. Instead the received vector can be oversampled at the array output by a factor of R. The samples are taken at nT/R where n∈Z, The block diagram of the system is shown in FIG. 6. The received signal is given by $x(kT + rT/R) = \quad (21)$ $$\sum_{m=1}^{M}\sum_{n=0}^{k}\sum_{l=1}^{L}\sqrt{\rho_{mi}G_{mi}\alpha_{mi}^{l}P_{m}}\; a_{m}(\theta_{l})g_{mi}(kT+rT/R-nT-\tau_{mi}^{l})$$

$$s_{m}(n)+n_{i}(kT+rT/R),$$

$$r=0,\ldots,R-1$$

Define $$h_{mi}(i)=\sum_{l=1}^{L}\sqrt{\rho_{mi}G_{mi}\alpha_{mi}^{l}}\; a_{mi}^{P}(\theta_{l})g_{mi}(t-\tau_{mi}^{l}) \quad (22)$$

The sampled received signal is then given by $$x_{i}(kT+rT/R)=\sum_{m=1}^{M}\sum_{n=0}^{k}\sqrt{P_{m}}\; h_{mi}((k-n)T+rT/R)s_{m}(n)+n_{i}(kT+rT/R) \quad (23)$$

$$=\sum_{m=1}^{M}\sum_{n=0}^{k}\sqrt{P_{m}}\; h_{mi}(nT+rT/R)s_{m}(k-n)+n_{i}(kT+rT/R)$$

Assume that the length of the impulse response is N. Then the received signal can be expressed as $$x_{i}(kT+rT/R)= \quad (24)$$

$$\sum_{m=1}^{M}\sqrt{P_{m}}\; H_{mi}(rT/R)s_{m}(k)+n_{i}(kT+rT/R),$$

$$r=0,\ldots,R-1$$

where $$H_{mi}(\gamma T/R)=[h_{mi}(\gamma T/R),\ldots,h_{mi}(N-1)T+\gamma T/R)] \quad (25)$$

and $$s_{m}(k)=[s_{m}(k),\ldots,s_{m}(k-N+1)]^{T}$$

Define a received vector $X_i(k)$ which consists of the received vectors at the sampling points:

$$X_{i}(k)=[x_{i}(kT),\ldots,x_{i}(kT+(R-1)T/R)]^{T}$$

From (24) and (25) it follows that $$\begin{bmatrix} x_{i}(kT) \\ \vdots \\ x_{i}(kT+(R-1)T/R) \end{bmatrix} =$$

$$\sum_{m}\begin{bmatrix} H_{mi}(rT/R) \\ \vdots \\ H_{mi}((R-1)T/R) \end{bmatrix} s_{m}(k) + \begin{bmatrix} n_{i}(kT) \\ \vdots \\ n_{i}(kT+(R-1)T/R) \end{bmatrix}$$

or $$X_{i}(k)=\sum_{m=1}^{M}\sqrt{P_{m}}\; H_{mi}s_{m}(k)+N_{i}(k), \quad (26)$$

where $$H_{mi}=\begin{bmatrix} H_{mi}(rT/R) \\ \vdots \\ H_{mi}((R-1)T/R) \end{bmatrix},$$

and $$N_{i}(k)=\begin{bmatrix} n_{i}(kT) \\ \vdots \\ n_{i}(kT+(R-1)T/R) \end{bmatrix}$$

The output of the combiner can be written as $$y_{i}(k)=\sum_{q=0}^{Q-1}w_{i}^{H}(q)X_{i}(k+q) \quad (27)$$

Since (7) and (27) have the same structure, the formulation of this problem would be the same as before.

In a another embodiment of the invention the received signal is oversampled in the transmit diversity (downlink) case. The block diagram of the transmit diversity system would be similar to that of FIG. 5, while the delay at each tap is T/R. The received signal at the ith mobile is given by $$\tilde{y}_{i}(t)=\sum_{b=1}^{B}\sum_{n=0}^{k}\sum_{l=1}^{L}\sum_{q=0}^{Q-1}w_{b}^{H}(q)a_{ib}(\theta_{l})\sqrt{\rho_{ib}G_{ib}\alpha_{ib}^{l}}\; g_{ib}(t-nT-\tau_{ib}^{l})\sqrt{\tilde{P}_{b}}\; \tilde{s}_{b}(n-q)+\tilde{n}_{i}(t) \quad (28)$$

where $k=[t/T]$. Define $$h_{ib}(n)=\sum_{l=1}^{L}\sqrt{\rho_{ib}G_{ib}\alpha_{ib}^{l}}\; a_{ib}(\theta_{l})g_{ib}(t-\tau_{ib}^{l})$$

Then (28) can be rewritten as $$\tilde{y}_i(t) = \sum_{b=1}^{B}\sum_{n=0}^{k}\sum_{l=1}^{L}\sum_{q=0}^{Q-1} \tilde{w}_b^H(q) h_{ib}(n) \sqrt{\tilde{P}_b}\, \tilde{s}_b(n-q) + \tilde{n}_i(t)$$

When the length of the channel response is less than N, the over sampled received signal is given by $$\tilde{y}_i(kT + rT/R) = \sum_{m=1}^{M}\sum_{n=0}^{k}\sum_{q=0}^{Q-1} \tilde{w}_b^H(r,q)\sqrt{P_b}\, h_{ib}(kT+rT/R-nT)\tilde{s}_b(n+q) + \tilde{n}_i(t)$$

$$= \sum_{m=1}^{M}\sum_{n=0}^{k}\sum_{q=0}^{Q-1} \tilde{w}_b^H(r,q)\sqrt{P_b}\, h_{ib}(nT+rT/R)\tilde{s}_b(k-n+q) + \tilde{n}_i(kT+rT/R)$$

$$= \sum_{m=1}^{M}\sum_{q=0}^{Q-1} \tilde{w}_b^H(r,q)\sqrt{P_b}\, h_{ib}(rT/R)\tilde{s}_b(k+q) + \tilde{n}_i(kT+rT/R)$$

(29)

where $H_{ib}(\gamma T/R)$ is defined as before:

$$H_{ib}(\gamma T/R) = [h_{ib}(\gamma T/R), \ldots, h_{ib}((N-1)T+\gamma T/R)]$$

Define:

$$\tilde{W}_b(r) = \begin{bmatrix} \tilde{w}_b(r,0) \\ \vdots \\ \tilde{w}_b(r,Q-1) \end{bmatrix},$$

and $$\tilde{X}_{ib}(rT/R,k) = \begin{bmatrix} \tilde{x}_{ib}(rT/R,k) \\ \vdots \\ \tilde{x}_{ib}(rT/R,k-Q+1) \end{bmatrix},$$

where $\tilde{x}_{ib}(\gamma T/R) = H_{ib}(\gamma T/R)\sqrt{P_b}\tilde{s}_b(k)$. Then the received signal at the ith receiver is represented by $$\tilde{y}_i(kT+rT/R) = \sum_{b=1}^{B} \tilde{W}_b^H \tilde{X}_{ib}(rT/R,k) + \tilde{n}_i(kT+rT/R) \quad (30)$$

In order to make the decision we average the received samples, i.e., $$\tilde{z}_i(k) = \sum_{b=1}^{B}\tilde{y}_i(kT+rT/R) = \sum_{r}\sum_{b=1}^{B} \tilde{W}_b^H(q)\tilde{X}_{ib}(rT/R,k) + \sum_{r}\tilde{n}_i(kT+rT/R)$$

$$= \sum_{b=1}^{B} \tilde{W}_b^H \tilde{X}_{ib}(k) + N_i(k)$$

where $$\tilde{W}_b^T = [\tilde{W}_b^T(0), \ldots, \tilde{W}_b^T((R-1)/R)]$$

and $$\tilde{X}_{ib}^T = [X_{ib}^T(0,k), \ldots, X_{ib}^T((R-1)T/R,k)]$$

Since (30) is similar to (17), we can calculate the multitap transmit diversity coefficients as before.

Figure 7:
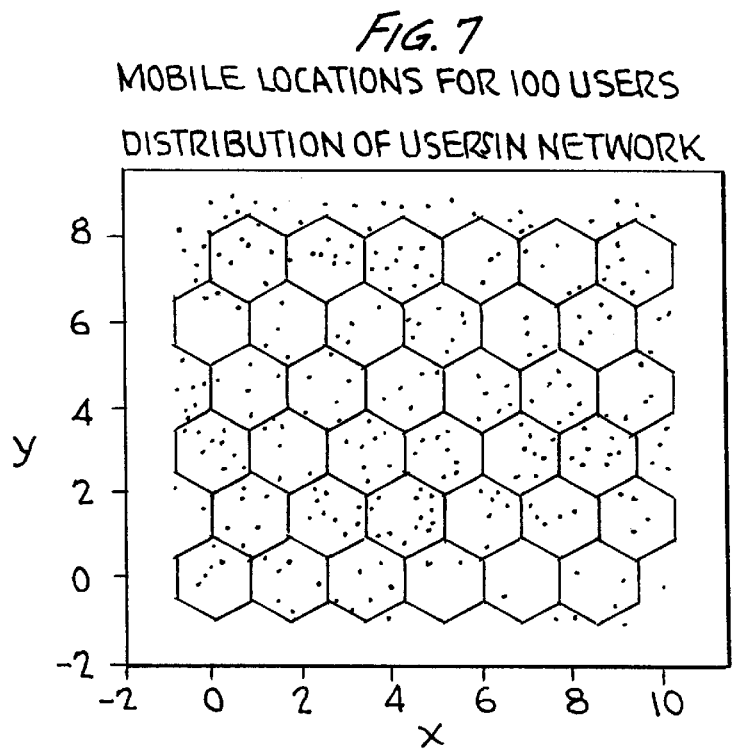
FIG. 7 plots the distribution of users in a cellular network simulation.
Figure 8:
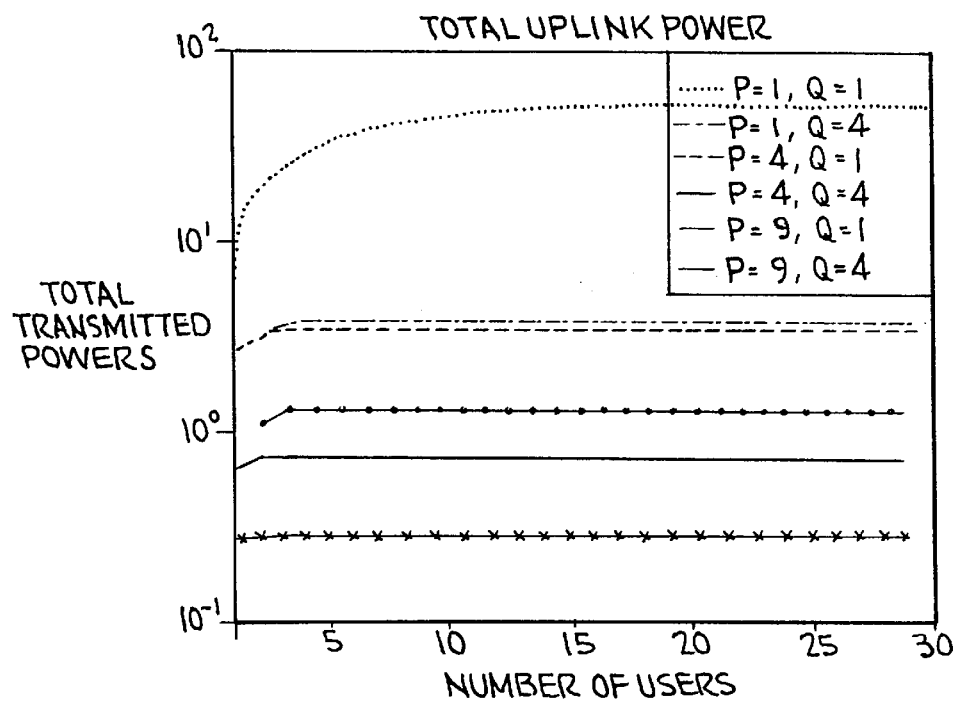
FIG. 8 plots the total mobile powers at each iteration in different system simulations.
Figure 9:
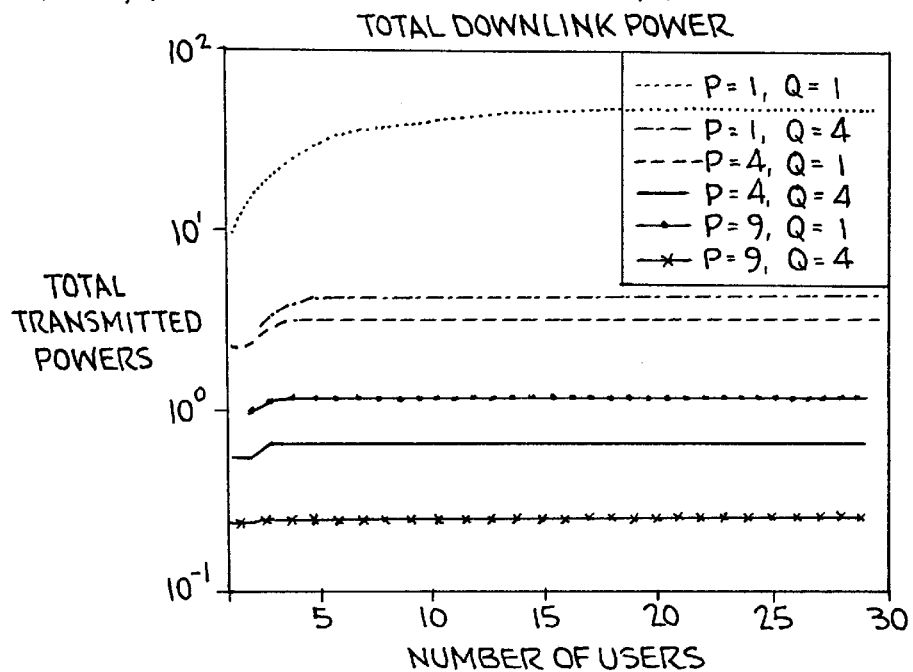
FIG. 9 illustrates the total base station powers at each iteration in different system simulations.

A cellular communications network with hexagonal cells can be simulated to demonstrate the invention. The path loss is proportional to $r^{-4}$, where r is the distance between the mobile and base station. For each link four paths with log-normal shadow fading and Rayleigh multipath fading are considered. The angle of arrival for each path is a uniform random variable in [0,2π]. The multipath fading, and angles of arrival are also independent in uplink and downlink. We consider an FDD network with 10% frequency difference between uplink and downlink. A total of 100 mobiles, depicted by dots in FIG. 7, are distributed throughout the network, and the base stations are placed at the center of each cell. FIG. 8 shows the total mobile power and FIG. 9 shows the total base station power at each iteration. Different configurations of the diversity combiner length (Q) and the number of array elements (P) are considered. (P=1, Q=1) curve shows the prior art case omnidirectional antennas and standard power control at the base stations. The solid curve shows that by using, as disclosed herein, joint space-time diversity combining and equalizers with length 4 and 9-element arrays at base stations we can significantly reduce the total transmitted power in both uplink and downlink.

Figure 10:
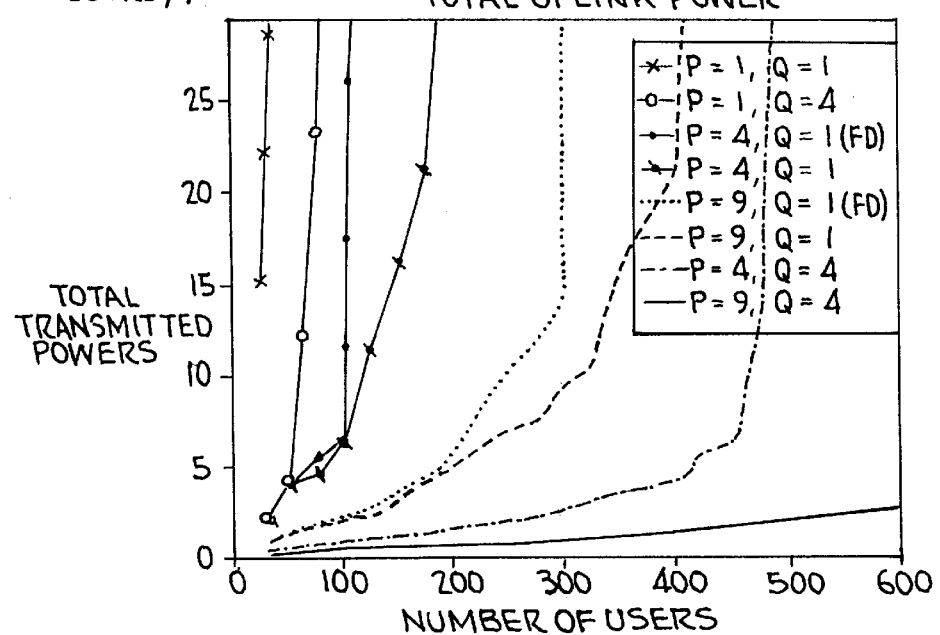
FIG. 10 illustrates the total mobile powers as a function of the number of users in different system simulations.
Figure 11:
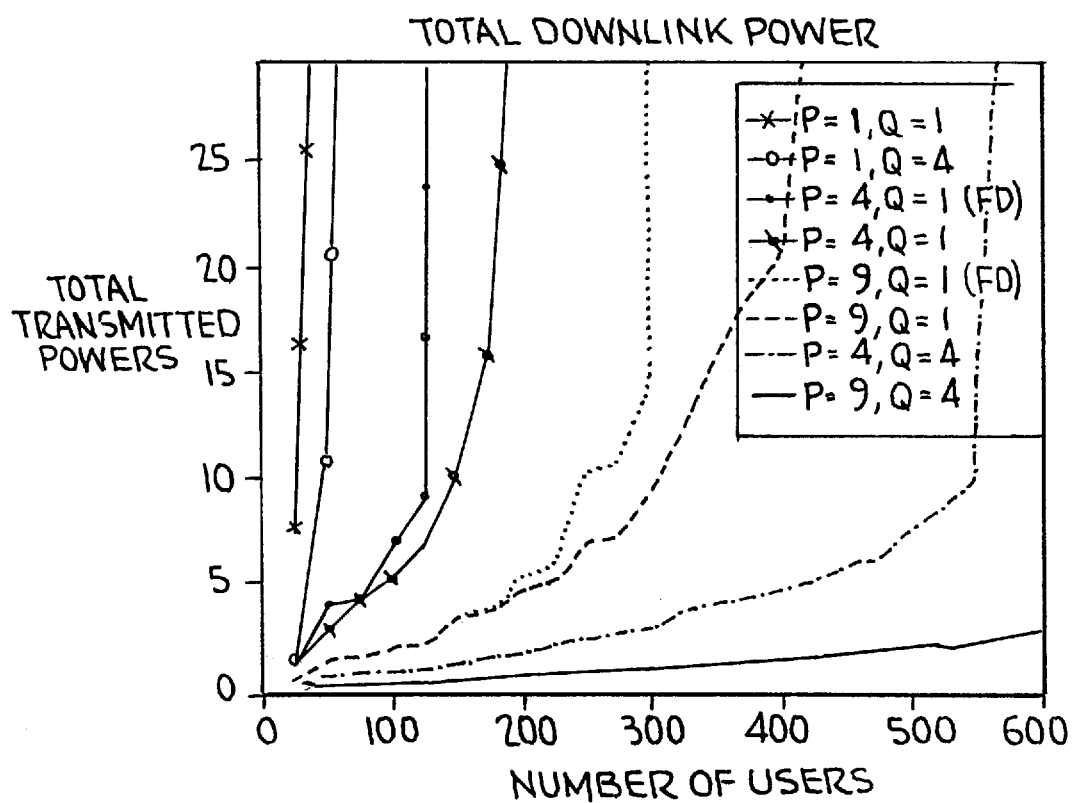
FIG. 11 illustrates the total base station powers as a function of the number of users in different system simulations.

The total transmitted power in uplink and downlink as a function of the number of users is shown in FIGS. 10 and 11 respectively. The maximum number of users in the network is a function of the number of taps in the multitap combiner (Q) and the number of array elements (P). A prior art single tap transmit diversity algorithm is proposed in which the receive diversity vectors are used for transmission. That algorithm will perform only in TDD networks with reciprocal channels. In FDD networks where the uplink and downlink channels are different, the above method will have poor performance and moreover, the transmit diversity vectors are not adjusted to guarantee the link quality. Instead of comparing the present invention with that algorithm, we modify Algorithm B in which the transmit vectors are calculated using the downlink gains and kept constant during the power control iterations. The results are shown with curves which are labeled with FD (fixed Diversity). The performance of this modified algorithm is better than the aforementioned prior art algorithm. Yet the maximum achievable capacity using this combined method is still less than single tap diversity combining as taught by the present invention. In FIGS. 10 and 11, the curves with Q=4 show the simulation results using joint space-time diversity combining and power control algorithm and P-element antenna arrays at the base stations. Using four element antenna arrays with diversity combining and power control the number of users is increased by a factor of four, compared to the case where we use only power control. Using time diversity in addition to space diversity, the capacity is improved by an additional factor of three. By comparison, in the fixed diversity method (FD curves in FIG. 11), the maximum number of users is significantly less.

We claim:

1. A method for adaptive receiver beamforming and transmitter power control in a cellular radio network having communications links between base stations and mobile stations, the network employing base station receiver diversity and mobile station power control, the method comprising the following steps:

determining a refined base station receive diversity weight vector for which a first quality measure is highest; and using the refined base station receive diversity weight vector to determine a refined set of mobile transmitter powers for which a second quality measure is highest.

2. The method of claim 1 wherein the first quality measure is the minimum value in the set of base station receiver signal to noise ratios.

3. The method of claim 1 wherein the second quality measure is the reciprocal of the sum of the mobile station transmitter powers.

4. The method of claim 1 wherein the receive signals at the base stations are oversampled.

5. A method for adaptive receiver beamforming and transmitter power control in a cellular radio network having communications links between base stations and mobile stations, the network employing base station receiver diversity and mobile station power control, the method comprising the steps of:

determining a refined base station receive diversity weight vector for which a first quality measure is highest; and using the refined base station receive diversity weight vector to determine a refined set of mobile transmitter powers for which a second quality measure is highest, such that total power transmission is minimized while maintaining a selected minimum transmission quality.

6. The method of claim 5 wherein the total transmitted power is defined as:

$$\min \sum_i Pi$$

$$AP$$

$$S, T, \Gamma \geq \gamma i.$$

7. The method according to claim 5 including determining the joint power and control and combining vector.

8. The method according to claim 5 including performing optimal power control over the network based upon local information.

9. A method for adaptive transmitter beamforming and power control in a cellular radio network having communications links between base stations and mobile stations, the network employing transmitter diversity and power control in the base stations, the method comprising the step of jointly determining a refined base station transmit diversity weight vector and a refined set of base station transmitter powers, for which a quality measure is satisfied.

10. The method of claim 9 wherein the quality measure is a set of predetermined values of the mobile receiver signal to noise ratios.

11. The method of claim 9 wherein the receive signals at the base stations are oversampled.

12. The method of claim 5, further comprising providing the one of the base stations with a channel response feedback pertaining to a respective one of the mobile stations for optimizing the respective one of the links therebetween.

13. The method of claim 5, further comprising providing the one of the base stations with interference feedback pertaining to a respective one of the mobile stations for optimizing the respective one of the links therebetween.

* * * * *